United States Patent [19]
Potts, Sr. et al.

[11] Patent Number: 5,297,280
[45] Date of Patent: Mar. 22, 1994

[54] AUTOMATICALLY RETRIEVING QUERIED DATA BY EXTRACTING QUERY DIMENSIONS AND MODIFYING THE DIMENSIONS IF AN EXTRACT MATCH DOES NOT OCCUR

[75] Inventors: George W. Potts, Sr., Wellesley; Mark Zand, Brighton; Terrence P. Higgins, Arlington, all of Mass.

[73] Assignee: Occam Research Corporation, Watertown, Mass.

[21] Appl. No.: 741,636

[22] Filed: Aug. 7, 1991

[51] Int. Cl.⁵ .............................................. G06F 15/40
[52] U.S. Cl. .................... 395/600; 364/282.1; 364/283.4; 364/DIG. 1
[58] Field of Search ................ 364/200; 395/600, 425, 395/700

[56] References Cited

U.S. PATENT DOCUMENTS

| | | | |
|---|---|---|---|
| 4,068,298 | 1/1978 | Dechant et al. | 395/425 |
| 4,631,664 | 12/1986 | Bachman | 395/600 |
| 4,751,635 | 6/1988 | Kret | 395/600 |
| 4,901,229 | 2/1990 | Tashiro et al. | 395/11 |

*Primary Examiner*—Thomas C. Lee
*Assistant Examiner*—Jennifer M. Orzech
*Attorney, Agent, or Firm*—Joseph S. Iandiorio

[57] ABSTRACT

An automatic data reference system and method responds to a query for a data item by determining whether a match can be found between the query dimensions and the dimensions of one of a number of data tables stored in the database for queries which constitute an exact match for an existing data table, as well as those queries which are underdefined, overdefined or require relational joining or linking of two or more data tables.

20 Claims, 7 Drawing Sheets

AUTOMATICALLY RETRIEVING QUERIED DATA BY EXTRACTING QUERY DIMENSIONS AND MODIFYING THE DIMENSIONS IF AN EXTRACT MATCH DOES NOT OCCUR

FIELD OF INVENTION

This invention relates to an improved data reference system and method, and more particularly to such a system and method which automatically resolves ambiguous queries and effects table selection, joining and sequencing in multi-dimensional, multi-table data bases.

BACKGROUND OF INVENTION

Data processing systems are often handicapped by the constraints imposed by the data bases on the manner in which the data may be accessed and retrieved. For example, in natural language systems (NLS) the form of the queries is quite flexible. But in one version of the NLS the data is arranged in one-dimensional tables only. If the data query does not exactly match one of the tables the system cannot respond. In another version of the NLS there is but one multi-dimensional table. Here too the match between query and table dimensions must be exact. With only one data table to work with, the available data is severely limited, for one table, even if it is multidimensional, cannot hold all the data items needed for a facile system.

Graphical input systems are somewhat less flexible in the form of queries acceptable. The query must precisely define the data items desired as well as the dimensions applicable. Further, the user must specify the tables to be accessed to respond to the query and if more than one table needs to be accessed the user must identify each such table and define the join between them. While the graphical approach does permit a large number of tables this is a problem as well as an advantage: the user must scan all of the tables in order to determine which tables are appropriate to access and whether or not and how to join them. And the difficulty becomes compounded when there are dozens or even hundreds of tables, only a few of which can be displayed at one time for review.

The least flexible approach for user queries is afforded by structural query language (SQL) which requires specific syntax table or tables to be specified. Further, the joins and any other artificial constructs must be stated precisely by the user. In all three of these approaches the query must be complete or the system cannot respond: a query which has more dimensions or fewer dimensions than the available data tables cannot be processed.

SUMMARY OF INVENTION

It is therefore an object of this invention to provide an improved automatic data reference system.

It is a further object of this invention to provide such an improved automatic data reference system which is extremely flexible as to the form of the input which it can accept.

It is a further object of this invention to provide such an improved automatic data reference system which responds to underdefined and overdefined queries as well as exact queries.

It is a further object of this invention to provide such an improved automatic data reference system which can fulfill queries through joining of data tables when no single table meets the query criteria.

It is a further object of this invention to provide such an improved automatic data reference system which can work with many, many data tables and multi-dimensional data tables.

It is a further object of this invention to provide such an improved automatic data reference system in which the user does not have to specify tables or sequence, and joining of tables as well as resolving of underdefined and overdefined queries is achieved implicitly without user intervention.

The invention results from the realization that a truly automatic data referencing system can be accomplished in regard to overdefined queries, underdefined queries, and even relational queries which require linking of data tables, by implicit selection of tables, linking of tables and sequencing of operations in multi-table and multidimensional table data bases.

This invention features an improved data reference system comprising means for storing a data base including a number of data tables and means for receiving a query for a data item. The system can variously and alternatively include means for determining whether an exact match can be found between the query dimensions and the dimensions of a table; means for determining whether a match can be found between the dimensions of an underdefined query and a table; means for determining whether a match can be found between the dimensions of an overdefined query and a table; and means for determining whether a relational match can be found between a query data item in one data table and a dimension in a different table. The system also includes means responsive to one of the means for determining for finding a match for retrieving the data item from the table that matches the query.

In a preferred embodiment, the means for determining whether an exact match can be found may include means for finding each table whose dimensions match the dimensions of the query, and means for establishing that the sought data item is in that table.

The means for determining whether a match can be found between the dimensions of an underdefined query and one of the tables may include means for incrementing the number of dimensions in the query and means for identifying each table having that incremented number of dimensions. There are means for ascertaining which table has the dimension of the query and the query data item, and means for introducing a default dimension for each missing dimension relative to the query dimensions.

The means for determining whether a match can be found between the dimensions of an overdefined query and one of the tables may include means for decrementing the number of dimensions in the query, and means for identifying each table having that decremented number of dimensions. There may also be means for ascertaining which table has the dimensions of the query and the query data item.

The means for determining whether a relational match can be found between a query data item in one data table and a dimension in a different data table may include means for ascertaining whether the query data item is linked and means responsive to the data item being linked for identifying the linked dimension. There may also be means for adding the identified dimension to the current dimensions.

The invention also features an improved data reference method including receiving a query for a data item stored in one of a number of data tables in a database and determining one or more of the following: whether an exact match can be found between the query dimensions and the dimensions of a table; whether a match can be found between the dimensions of an underdefined query and a table; whether a match can be found between the dimensions of an overdefined query and a table; and whether a relational match can be found between a query data item in one data table and a dimension in a different data table. Finally, the data item is retrieved from the data table that matches the query.

In a preferred embodiment, determining whether an exact match can be found may include finding each table whose dimensions match the dimensions of the query, and establishing that the sought data item is in that table. Determining whether a match can be found between the dimensions of an underdefined query and one of the tables may include incrementing the number of dimensions in the query, identifying each table having that incremented number of dimensions, ascertaining which table has the dimension of the query and the query data item, and introducing a default dimension for each missing dimension relative to the query dimensions. Determining whether a match can be found between the dimensions of an overdefined query and one of the tables may include decrementing the number of dimensions in the query, identifying each table having that decremented number of dimensions, and ascertaining which table has the dimensions of the query and the query data item.

Determining whether a relational match can be found between the query data item in one data table and a dimension in a different data table may include ascertaining whether the query data item is linked, identifying the linked dimension, and adding the identified dimension to current dimensions.

DISCLOSURE OF PREFERRED EMBODIMENT

Other objects, features and advantages will occur to those skilled in the art from the following description of a preferred embodiment and the accompanying drawings, in which.

Figure 1:
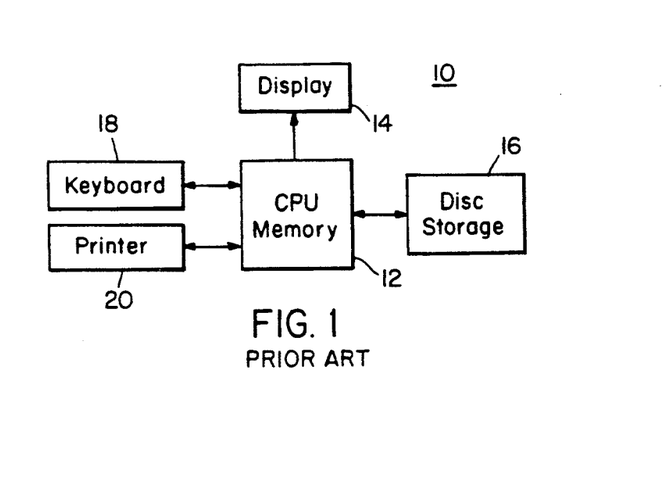
FIG. 1 is a block diagram of a computer that can be used according to this invention.
Figure 2:
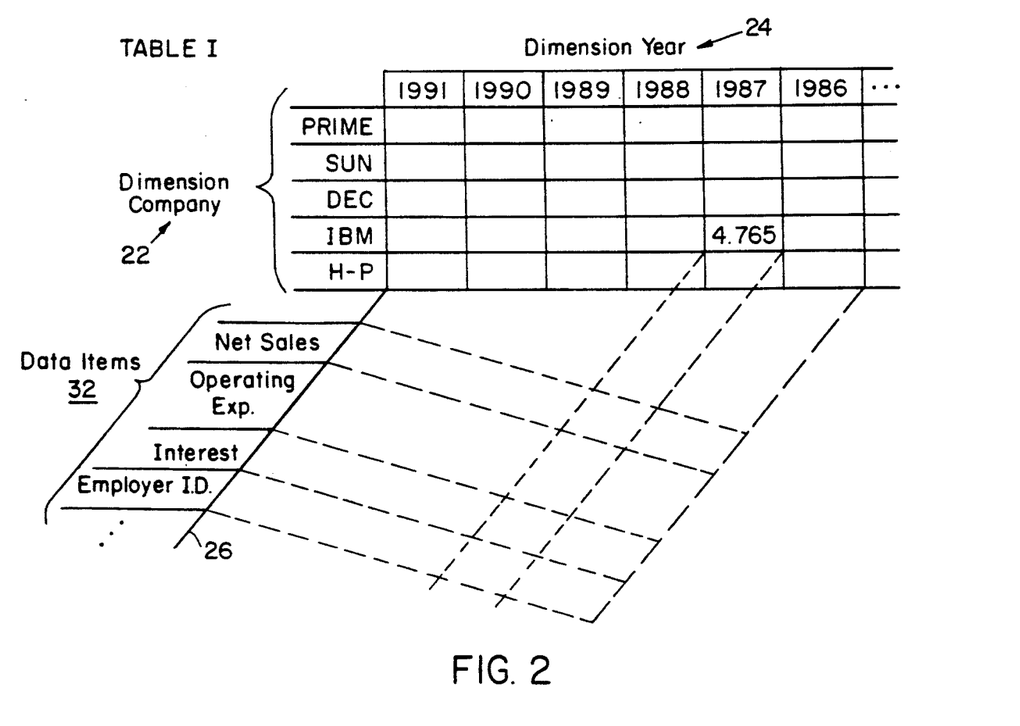
FIG. 2 is a conceptualized view of a multi-dimensional table accessible by means of this invention.
Figure 3:
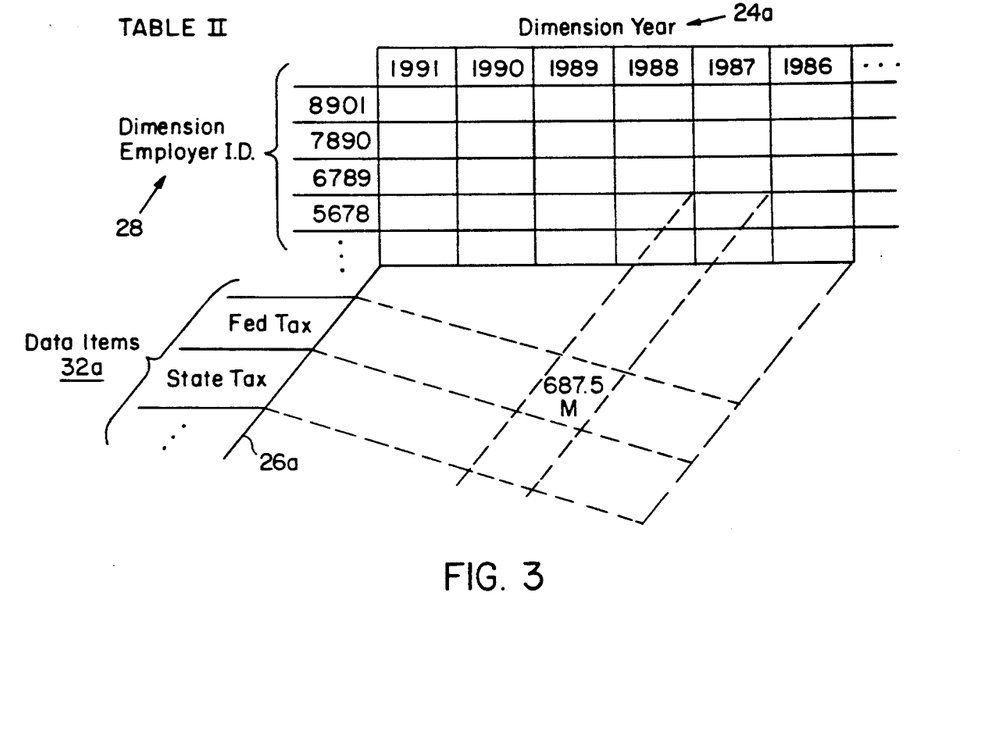
FIG. 3 is a view similar to FIG. 2 of another multi-dimensional table accessible by means of this invention.

There is shown in FIG. 1 a computer system 10 such as an Apple McIntosh II, II CX, II FX, or similar system, which may include CPU and memory 12, display 14, storage such as disk storage 16, keyboard 18, and printer 20. Storage 16 may hold one or more databases. Each database may include a number of data tables which may be multi-dimensional. One such table, Table I, FIG. 2, includes two dimensions: dimension 22, company names, and dimension 24, years. Each table also includes data items, shown physically along axis 26, listing such sets of data items as cost of sales, operating expenses, interest, employer identification number and the like. Each of these data items represents a plane of information superimposed on the company 22 and year 24 dimensions. A second multi-dimensional table, Table II, FIG. 3, likewise includes two dimensions. Table II may include one of the same dimensions as Table I, year dimension 24a, and a different dimension 28, Employer ID. In Table II, the data items along axis 26a include federal tax, and state tax.

Figure 4:
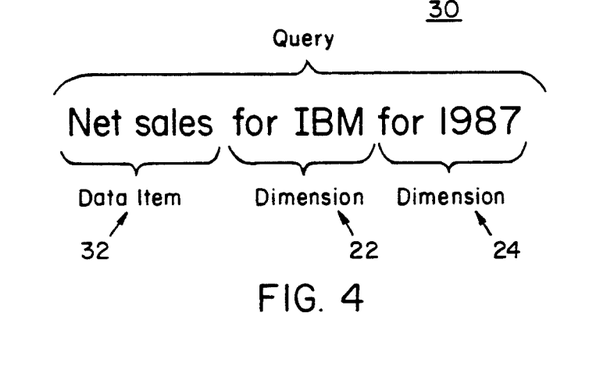
FIG. 4 is a typical query that may be answered according to the improved data reference system of this invention.

When a request is submitted to the system for retrieval of a data item, it normally comes in the form of query 30, FIG. 4, where the data item 32 is net sales, and the two dimensions, company 22 and year 24, are IBM and 1987, respectively. The answer to query 30 can be found in FIG. 2 at the junction of IBM and 1987 in the plane of the data items net sales, where appears the number $4.765 billion. The interpretation of the query by the system to resolve those words which are operative words to the system and those that are not, those that are data items and those that are dimensions, may be done by any suitable conventional technique including more sophisticated approaches such as language interpreters, parsers and the like.

Figure 5:
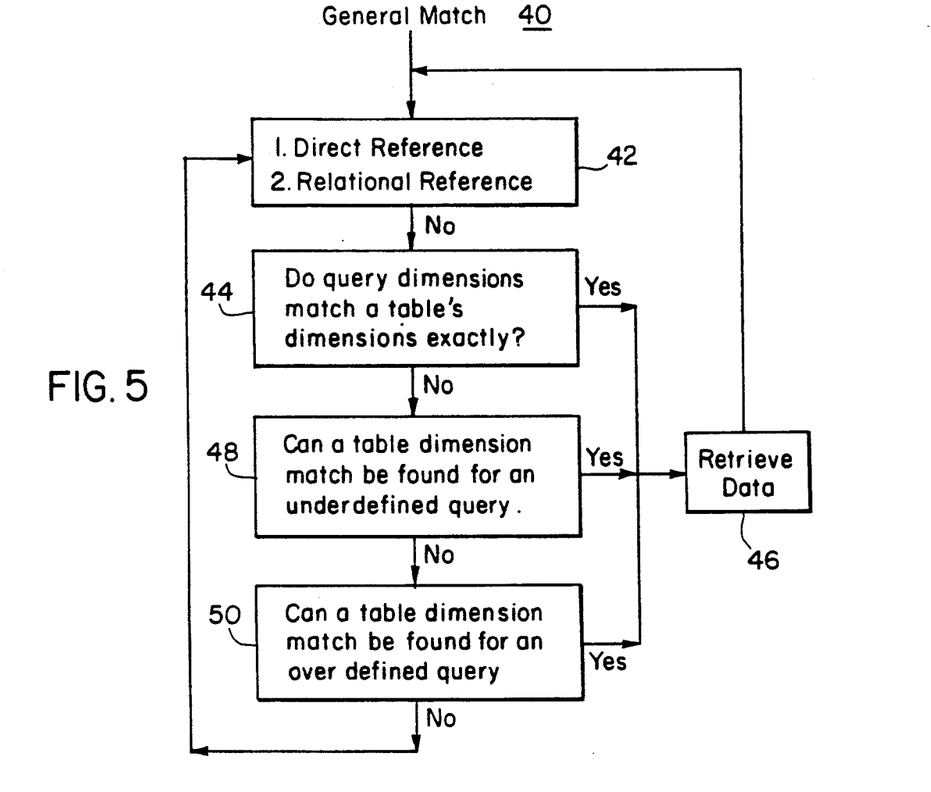
FIG. 5 is a block diagram of a general match routine for implementing this invention.

When the system according to this invention receives a query such as query 30, it enters the general match routine 40, FIG. 5. Initially the inquiry is made as to whether this is a relational reference operation in step 42. If it is not, it is designated a direct reference and the system moves directly to step 44, where an attempt is made to match the query dimensions, company 22 and year 24, exactly with dimensions of a table in the database. If an exact match is found, the system retrieves the data from the matched table in step 46, and returns ready to service another query. If an exact match with the query cannot be made, then in step 48 an attempt is made to match an underdefined query. If a match is made, the system again retrieves the data from the matched table. If a match cannot be made on the basis of an underdefined query, the system moves to step 50 where it attempts to match a table dimension for an overdefined query. If a match is found, the data is retrieved from the table. If no match can be found for an overdefined query, the system returns directly to step 42 where it undertakes the relational reference mode. In this mode the system attempts to find the data by linking data items (table joins) from different data tables, as will be explained further with reference to FIGS. 11 and 12. If this attempt is successful, the system then returns to proceed once again through steps 44, 48 and 50.

Figure 6:
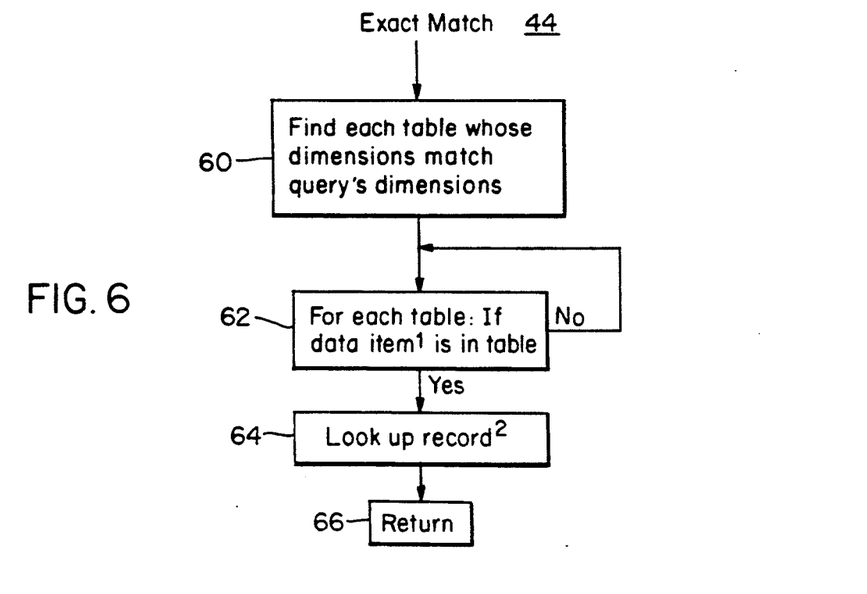
FIG. 6 is a more detailed view of the exact match subroutine of FIG. 5.

The exact match subroutine 44, FIG. 6, begins at step 60 by finding each table whose dimensions match the query's dimensions. Then in step 62, for each such table a determination is made as to whether or not the query data item is found in that table. If not, the system loops back and checks the next table for the data item. When the data item is found in a table, the system retrieves the data (looks up the record), step 64, and then returns, step 66.

Figure 7:
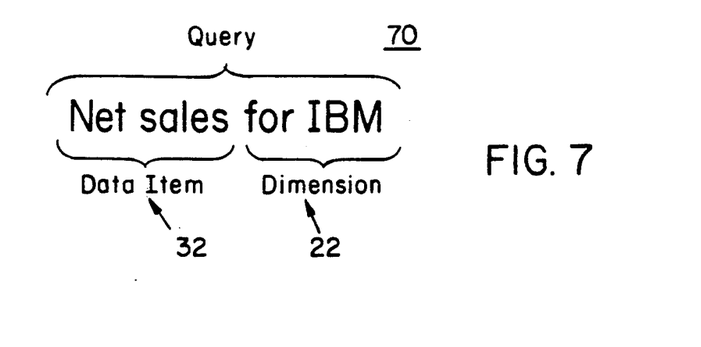
FIG. 7 is a query similar to that of FIG. 4 but underdefined.

If the query is underdefined as is query 70, FIG. 7, then the underdefined subroutine 48 must be called. A query is underdefined when it has fewer dimensions than those of any of the tables or it is missing at least one dimension relative to any table in the database. Thus query 70 is underdefined with respect to Tables I and II because it has only one dimension, and lacks the second dimension, 24. Underdefined matched subroutine 48, FIG. 8, begins by incrementing the number of query dimensions by one in step 72. Query 70 would thus be incremented to two dimensions. Then in step 74, each table with this number of dimensions is found. The system then moves to step 76 to ascertain whether or not the first found table contains the dimension or dimensions sought, and also the query data item. If in step 74 no tables are found, the system simply returns to step 72 and increments the number of query dimensions again in order to attempt to find one or more tables with the proper number of dimensions. If in step 76 the first table does not contain the dimension or dimensions contained in the query and the data item contained in the query, the system returns to step 74 to check the next found table.

Figure 8:
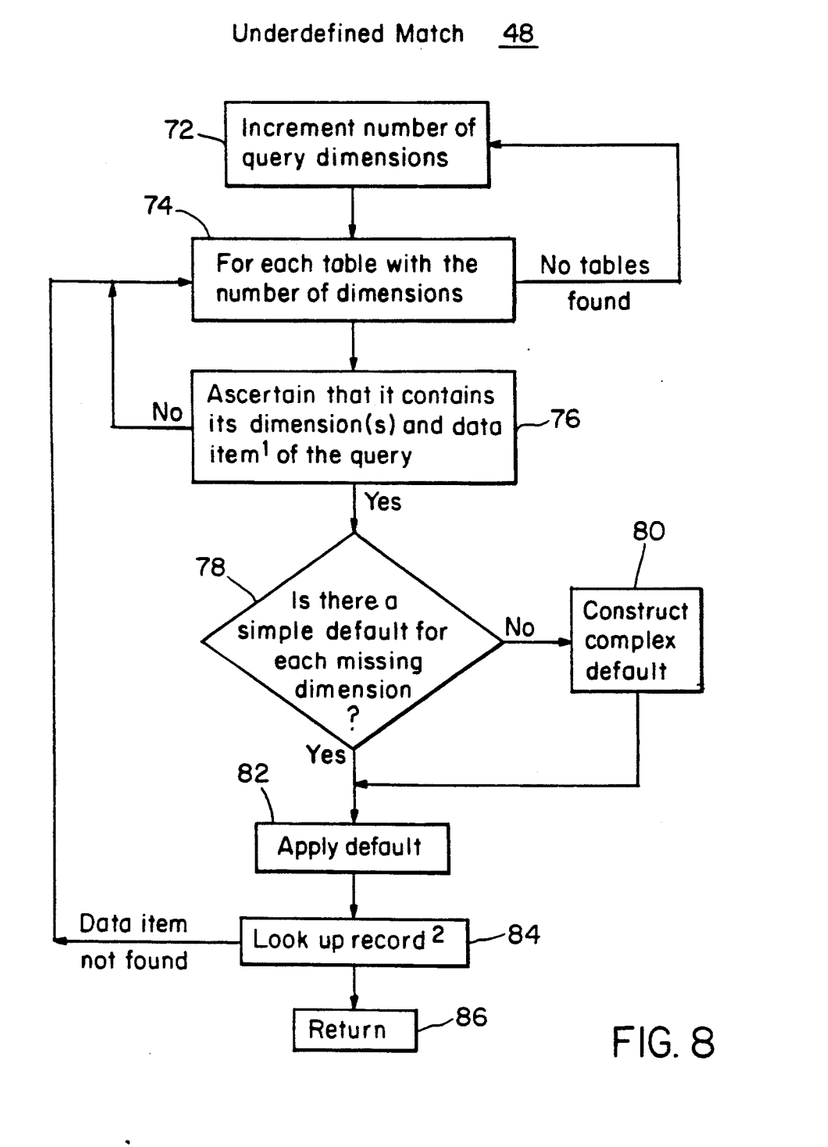
FIG. 8 is a block diagram of the underdefined match subroutine of FIG. 5.

If the current table does have the correct number of dimensions, the query dimensions, and the query data item, then the inquiry is made in step 78 as to whether there is available a simple default for each missing dimension. A simple default would be an instruction to simply add the current year, for example if the year dimension were missing. If there is not a simple default, but a complex one, like a total of all the years or an average of all the years, then the expanded default is computed in step 80. Following step 78 or step 80 the default is applied in step 82, and then the record is looked up in step 84, after which the system returns to step 86. If upon looking up the record in step 84 the specific data item sought is not found, the system returns to step 74 to look at the next table.

Figure 9:
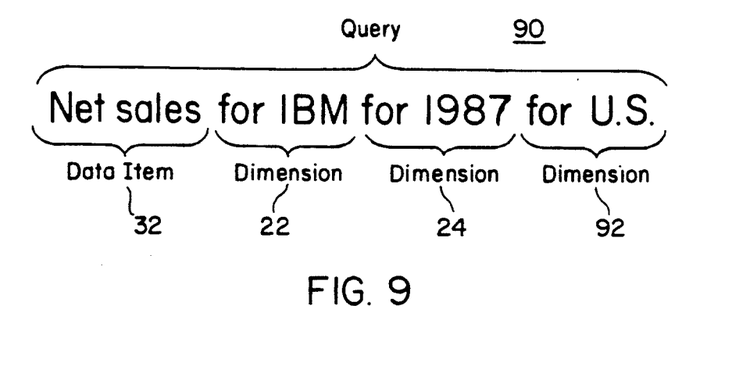
FIG. 9 is a query similar to that of FIG. 4 but overdefined.
Figure 10:
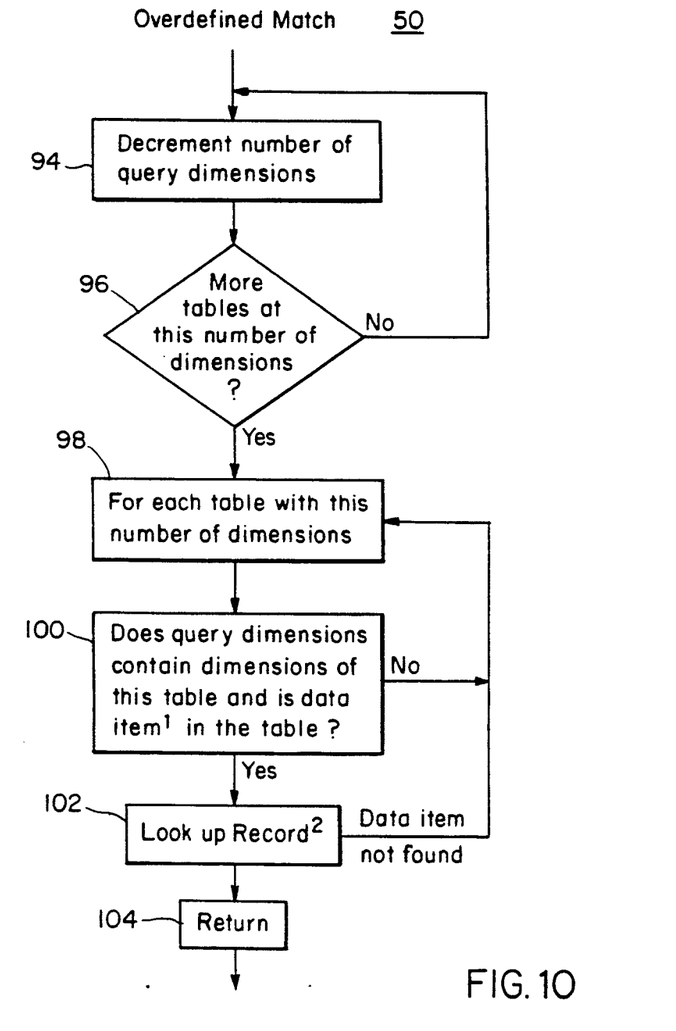
FIG. 10 is a block diagram of the overdefined match subroutine of FIG. 5.

If the query is overdefined as query 90, FIG. 9, then the overdefined subroutine 50 is called. A query is overdefined when it has more dimensions than those of any of the tables or it has at least one more dimension relative to any table in the database. Thus, query 90 is overdefined because, with respect to Tables I and II, in addition to the data item 32 and dimensions 22 and 24 it contains dimension 92, the dimension of country, which in this case is indicated as U.S. Under these conditions, overdefined match subroutine 50 decrements by one the number of query dimensions in step 94 and then inquires in step 96 as to whether there are more tables with this number of dimensions. If the response is negative, the system returns to step 94. If the response is affirmative, then in step 98 each table with this number of dimensions is identified and in step 100 inquiry is made as to whether the query dimensions contain dimensions of this table and further inquiry is made as to whether the data item is in this table. If the answer to either inquiry is negative, the system returns to step 98. If the answers to both are affirmative, the record is looked up in step 102. If the data item is not found the system returns to step 98. If it is found, the system returns to step 104.

Figure 11:
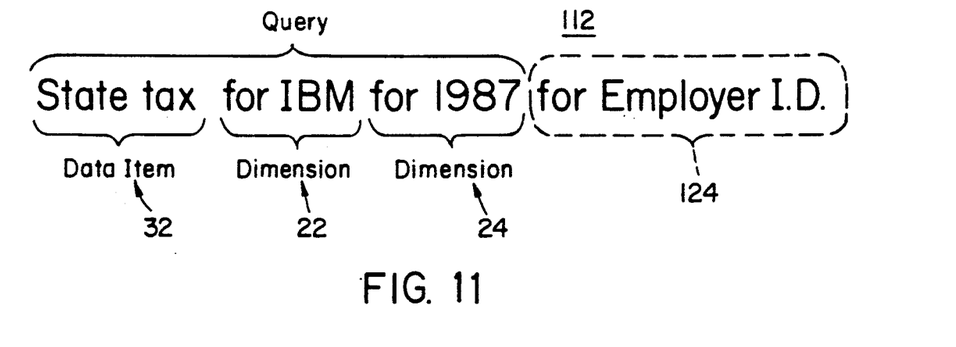
FIG. 11 is a query similar to that shown in FIG. 4 but which requires relational matching or joining through data table linking.

In the case where the query cannot be answered or resolved either in the exact match subroutine 44, the underdefined subroutine 48, or the overdefined subroutine 50, the system returns to the relational reference mode in step 42, FIG. 5. The relational reference mode calls the linking subroutine 110, FIG. 12. One such query, query 112, is shown in FIG. 11, where data item 32 is state tax and the dimensions, country 22 and year 24, are the same as previously. While Table I, FIG. 2, has both dimensions, year 24 and company 22, it contains no data item for state tax. Table II, FIG. 3, contains year dimension 24a but its second dimension 28 is employer ID, which does not match with that of the query. Accordingly, the query cannot be answered by the exact match, underdefined, or overdefined subroutines. However, Table II does contain, as the second plane of data items, state tax. Thus the employer ID can be retrieved as a data item from Table I, FIG. 2, and then of as dimension 28 in Table II in order to access the state tax, which is the second plane of data items in Table II. This is accomplished in the relational reference mode by the linking subroutine 110, FIG. 12.

Figure 12:
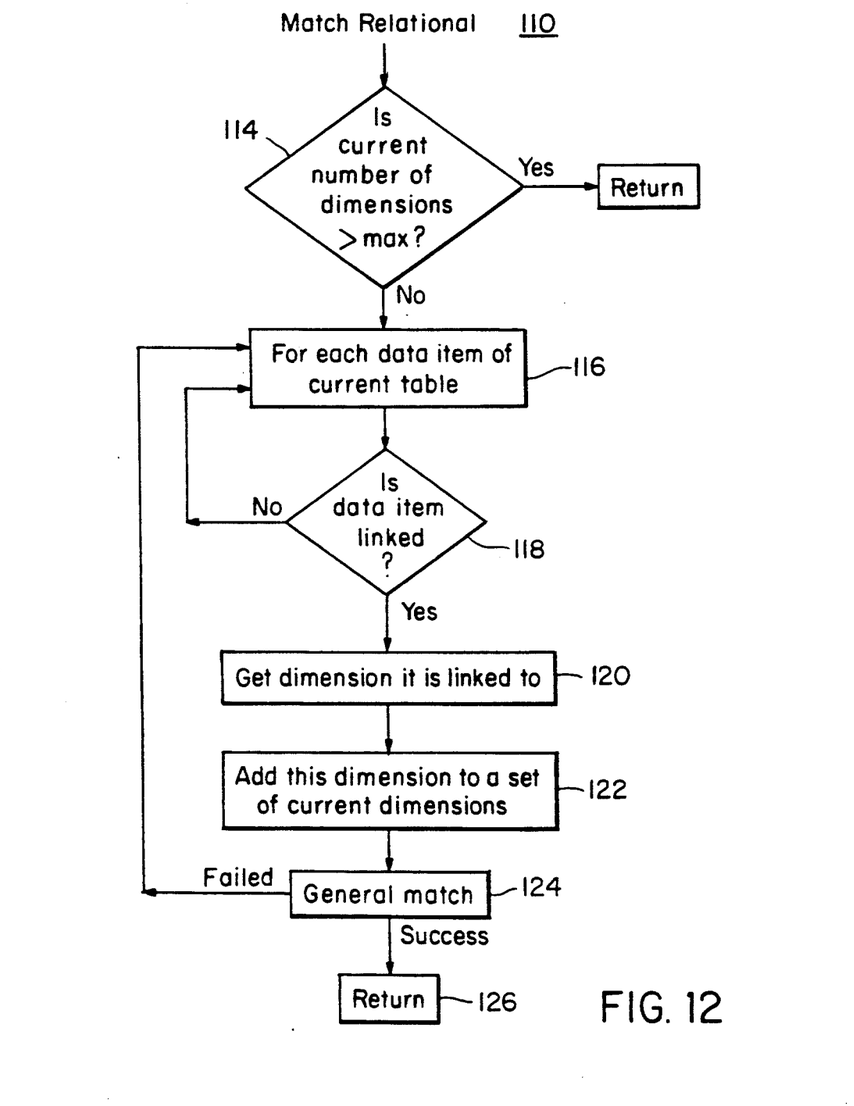
FIG. 12 is a block diagram of the relational reference subroutine of FIG. 5.

The system begins by inquiring as to whether the current number of dimensions in the query, step 114, is greater than the maximum cognizable by the system. If it is the system simply returns. If it is within the capacity of the system, then each data item of the current table, step 116, is reviewed, and inquiry is made in step 118 as to whether the data item is joined to a dimension in another table. If it is not, the system returns to step 116. If it is joined (as in the case of state tax being linked through the dimension, Employer ID, in Table II to the data item of employer ID in Table I), then the system moves to step 120, where the employer ID data item in Table I is identified as a dimension 28 in Table II. This new dimension, the Employer ID dimension 28, is then added in step 122 to the dimensions already in query 112 as shown in phantom in FIG. 11. With the addition of the new dimension 124, FIG. 11, query 112 can now be submitted to the general match routine 40 in step 124. If the general match routine is successful the system returns to step 126. If the general match routine fails then the system returns to step 116 and searches another data item in the current table.

Figure 13:
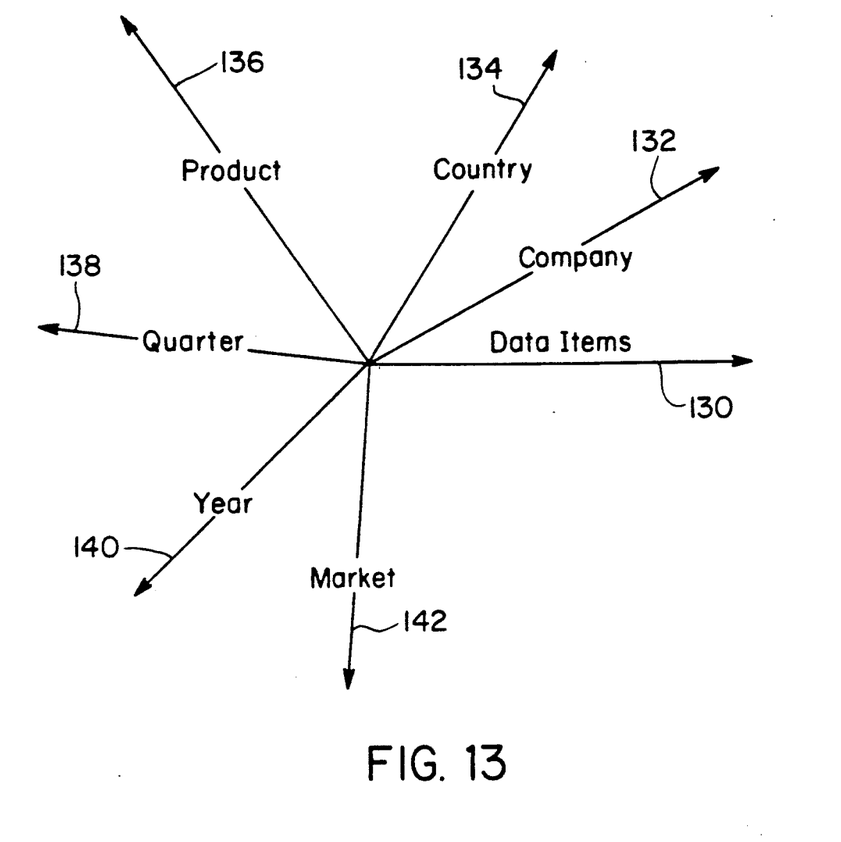
FIG. 13 is a schematic representation of a multi-dimensional table which may be accessed with this invention.

Although thus far the invention has been explained with reference to multi-dimensional tables, this is not a necessary limitation of the invention. Single-dimension tables can be used as well, where there is but one dimension and each of the listings in that dimension has associated with it one or more data items. Alternatively, the multi-dimensional tables may extend to three, four or more dimensions. For example, there is shown schematically in FIG. 13 a representation of a single multi-dimensional table which shows its data items on axis 130 and on its six remaining axes 132-142 shows the dimensions of company, country, product, quarter, year and market, for example.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A data reference system comprising:
   means for storing a data base including a number of data tables wherein at least one of said data tables has at least two dimensions;

means for receiving a query for a data item;

means for extracting the dimensions from the query and for determining the number of dimensions extracted from said query;

means for determining whether an exact match is found between the extracted query dimensions and the dimensions in said number of data tables, wherein an exact match data table contains the same number of dimensions as the number determined from said received query means, coupling to said exact match determining means, for determining, if it is determined there is no exact match, whether a match is found between the query dimensions of an underdefined query and the dimensions in said number of data tables, the number of dimensions of said underdefined query is derived by adding at least one dimension to the number of dimensions determined from the received query;

means, coupling to said underdefined query determining means, for determining, if it is determined the query is not underdefined, whether a match is found between the query dimensions of an overdefined query and the dimensions in said number of data tables, the number of dimensions of said overdefined query is derived by subtracting at least one dimension from the number of dimensions determined from the received query; and means, responsive to one of said means for determining whether a match is found, for retrieving said data item from one of said data tables with the dimensions that matched the query.

2. The data reference system of claim 1 in which said means for determining whether an exact match is found includes means for finding each of said data tables whose dimension match the extracted dimensions of the query, and means for establishing in which table of the found tables the data item is contained.

3. The data reference system of claim 1 in which said means for determining whether a match is found between the dimensions of an underdefined query in one of said data tables includes means for incrementing the number of dimensions in the query, means for identifying each table having the incremented number of dimensions, means for ascertaining which table, containing the incremented number of dimensions has the dimensions, and data item of the query and means for introducing a default dimension for each missing dimension relative to the query dimensions.

4. The data reference system of claim 1 in which said means for determining whether a match is found between the dimensions of an overdefined query in one of said data tables includes means for decrementing the number of dimensions in the query, means for identifying each table having that decremented number of dimensions, and means for ascertaining which table, containing the decremented number of dimensions, has the dimensions and data item of the query.

5. The data reference system of claim 1 further including means for determining whether a relational match is found between a second data item in one of said data tables and a dimension in a different one of said data tables.

6. The data reference system of claim 5 in which said means for determining whether a relational match is found includes means for ascertaining whether said second data item is joined, means responsive to said second data item being joined for identifying the joined dimension, and means for adding the identified dimension to the received query dimensions.

7. A data reference system comprising:

means for storing a data base including a number of data tables wherein at least one of said data tables has at least two dimensions;

means for receiving a query for a data item;

means for extracting the dimensions from the query and for determining the number of dimensions extracted from said query;

means for determining whether a match is found between the query dimensions of an underdefined query and the dimensions in said number of data tables, the number of dimensions of said underdefined query is derived by adding at least one dimension to the number of dimensions determined from the received query, wherein said means for determining a match includes means for incrementing the number of dimensions in said query;

means for identifying each of said data tables having the incremented number of dimensions of the underdefined query, means for ascertaining which table containing the incremented number of dimensions has the dimensions and data item of the query and means for introducing a default dimension for each missing dimension relative to the query dimensions; and means, responsive to said means for determining whether a match is found, for retrieving the data item from one of said data tables with the dimensions and the data item that matched the query.

8. A data reference system comprising:

means for storing a data base including a number of data tables wherein at least one of said data tables has at least two dimensions;

means for receiving a query for a data item;

means for extracting the dimensions from the query and for determining the number of dimensions extracted from said query;

means for determining whether a match is found between the query dimensions of an overdefined query and the dimensions in said number of data tables, the number of dimensions of said overdefined query is derived by subtracting at least one dimension from the number of dimensions determined from the received query wherein said means for determining a match includes means for decrementing the number of dimensions in said query;

means for identifying each of said data tables having the decremented number of dimensions of the overdefined query, and means for ascertaining which table containing the decremented number of dimensions has the dimensions and data item of the query; and means, responsive to said means for determining whether a match is found, for retrieving the data item from one of said data tables with the dimensions and the data item that matched the query.

9. A data reference system comprising:

means for storing a data base including a number of data tables wherein at least one of said data tables has at least two dimensions;

means for receiving a query for a first data item;

means for extracting the dimensions from the query;

means for determining whether a relational match is found between a second data item in one of said data tables and a dimension in a different one of said data tables, including means for determining whether said second data item is joined, means responsive to the second data item being joined for identifying the joined dimension, means for adding the identified dimension to the received query dimensions; and means, responsive to said means for determining whether a match is found, for retrieving the first data item from the data table with the identified dimension that was added to the received query dimensions.

10. A data reference system comprising:

means for storing a data base including a number of data tables wherein at least one of said data tables has at least two dimensions;

means for receiving a query for a first data item;

means for extracting the dimensions from the query and for determining the number of dimensions extracted from said query;

means for determining whether an exact match is found between the extracted query dimensions and the dimensions in said number of data tables, wherein an exact match data table contains the same number of dimensions as the number determined from said received query;

means, coupling to said exact match determining means, for determining, if it is determined there is no exact match, whether a match is found between the query dimensions of an underdefined query and the dimensions in said number of data tables, the number of dimensions of said underdefined query is derived by adding at least one dimension to the number of dimensions determined from the received query;

means, coupling to said underdefined query determining means, for determining, if it is determined the query is not underdefined, whether a match is found between the query dimensions of an overdefined query and the dimensions in said number of data tables, the number of dimensions of said overdefined query is derived by subtracting at least one dimension from the number of dimensions determined from the received query;

means, coupling to said overdefined query determining means, for determining, if it is determined the query is not overdefined, whether a relational match is found between a second data item in one of said data tables and a dimension in a different one of said data tables, including means for determining whether said second data item is joined to the dimension in a different one of said data tables, means responsive to the second data item being joined for identifying the joined dimension, means for adding the identified dimension to the received query dimensions; and means, responsive to one of said means for determining whether a match is found, for retrieving the first data item from one of said data tables with the dimensions that matched the query.

11. A data reference method comprising:

storing a data base including a number of data tables in a storage device wherein at least one of said data tables has at least two dimensions;

receiving a query from an input device for a data item stored in one of said number of data tables in said data base;

extracting the dimensions from the query;

determining the number of dimensions extracted from said query;

determining whether an exact match is found between the extracted query dimensions and the dimensions in said number of data tables, wherein an exact match data table contains the same number of dimensions as the number determined from said received query;

determining, if it is determined there is no exact match, whether a match is found between the query dimensions of an underdefined query and the dimensions in said number of data tables, the number of dimensions of said underdefined query is derived by adding at least one dimension to the number of dimensions determined from the received query;

determining, if it is determined the query is not underdefined, whether a match is found between the query dimensions of an overdefined query and the dimensions in said number of data tables, the number of dimensions of said overdefined query is derived by subtracting at least one dimension from the number of dimensions determined from the received query; and retrieving the data item from one of said data tables with the dimensions that matched the query dimensions.

12. The improved data reference method of claim 11 in which determining whether an exact match is found includes finding each of said data tables whose dimensions match the extracted dimensions of the query, and establishing which table of the found tables the data item is contained.

13. The improved data reference method of claim 11 in which determining whether a match is found between the dimensions of an underdefined query and one of said data tables includes incrementing the number of dimensions in the query, identifying each table having the incremented number of dimensions, ascertaining which table, containing the incremented number of dimensions, has the extracted dimensions and data item of the query; and introducing a default dimension for each missing dimension relative to the query dimensions.

14. The improved data reference method of claim 11 in which determining whether a match is found between the dimensions of an overdefined query and one of said data tables includes decrementing the number of dimensions in the query, identifying each table having that decremented number of dimensions, and ascertaining which table, containing the decremented number of dimensions, has the extracted dimensions and data item of the query.

15. The improved data reference method of claim 11 further including determining whether a relational match is found between a second data item in one of said data tables and a dimension in a different one of said data tables.

16. The data reference method of claim 15 in which determining whether a relational match is found includes ascertaining whether the query data item is joined, identifying the joined dimension, and adding the identified dimension to the received query dimensions.

17. A data reference method comprising:

storing a data base in a storage device including a number of data tables wherein at least one of said data tables has at least two dimensions;

receiving a query from an input device for a data item stored in one of said number of data tables in said data base;

extracting the dimensions from the query;
determining the number of dimensions extracted from said query; and
determining whether a match is found between the query dimensions of an underdefined query and the dimensions in said number of data tables, the number of dimensions of said underdefined query is derived from incrementing by at least one dimension the number of dimensions determined from the received query; and
identifying each of said data tables having the incremented number of dimensions of the underdefined query, ascertaining which table containing the incremented number of dimensions has the dimensions and data item of the query and introducing a default dimension for each missing dimension relative to the query dimensions; and
retrieving the data item from one of said data tables with the dimensions and the data item that matched the query.

18. A data reference method comprising:
storing a data base in a storage device including a number of data tables wherein at least one of said data tables has at least two dimensions;
receiving a query from an input device for a data item stored in one of said number of data tables in said data base;
extracting the dimensions from the query;
determining the number of dimensions extracted from said query; and
determining whether a match is found between the query dimensions of an overdefined query and the dimensions in said number of data tables, the number of dimensions of said overdefined query is derived from decrementing by at least one dimension the number of dimensions determined from the received query;
identifying each of said data tables having the decremented number of dimensions of the overdefined query, and ascertaining which table containing the decremented number of dimensions has the dimensions and data item of the query; and
retrieving the data item from one of said data tables with the dimensions and the data item that matched the query.

19. A data reference method comprising:
storing a data base in a storage device including a number of data tables wherein at least one of said data tables has at least two dimensions;
receiving a query from an input device for a first data item stored in one of said number of data tables in said data base;
extracting the dimensions from the query;
determining whether a relational match is found between a second data item in one of said data tables and a dimension in a different one of said data tables, and determining whether said second data item is joined to a dimension in the different one of said data tables;
identifying the joined dimension, and adding the identified dimension to the received query dimensions; and
retrieving the first data item from the data table with the identified dimension that was added to the received query dimensions.

20. A data reference method comprising:
storing a data base in a storage device including a number of data tables wherein at least one of said data tables has at least two dimensions;
receiving a query from an input device for a first data item stored in one of said number of data tables in said data base;
extracting the dimensions from the query;
determining the number of dimensions extracted from said query;
determining whether an exact match is found between the extracted query dimensions and the dimensions in said number of data tables, wherein an exact match data table contains the same number of dimensions as the number determined from said received query;
determining, if it is determined there is no exact match, whether a match is found between the query dimensions of an underdefined query and the dimensions in said number of data tables, the number of dimensions of said underdefined query is derived by adding at least one dimension to the number of dimensions determined from the received query;
determining, if it is determined the query is not underdefined, whether a match is found between the query dimensions of an overdefined query and the dimensions in said number of data tables, the number of dimensions of said overdefined query is derived by subtracting at least one dimension from the number of dimensions determined from the received query;
determining, if it is determined the query is not overdefined, whether a relational match is found between a second data item in one of said data tables and a dimension in a different one of said data tables, and determining whether said second data item is joined to the dimension in a different one of said data tables, and identifying the joined dimension, and adding the identified dimension to the received query dimensions; and
retrieving the first data item from one of said data tables with the dimensions that matched the query.

* * * * *